(12) United States Patent
Galivel et al.

(10) Patent No.: US 7,870,744 B2
(45) Date of Patent: Jan. 18, 2011

(54) ATTACHMENT UNIT OF DRIVING SHAFT WITH TENSIONER NUT

(75) Inventors: Jean Pierre Galivel, Savigny le Temple (FR); Regis Eugene Henri Servant, Vigneux sur Seine (FR)

(73) Assignee: SNECMA, Paris (FR)

( * ) Notice: Subject to any disclaimer, the term of this patent is extended or adjusted under 35 U.S.C. 154(b) by 625 days.

(21) Appl. No.: 11/627,625

(22) Filed: Jan. 26, 2007

(65) Prior Publication Data

US 2007/0177935 A1  Aug. 2, 2007

(30) Foreign Application Priority Data

Jan. 27, 2006  (FR)  ................................. 06 50293

(51) Int. Cl.
*F02C 3/10* (2006.01)

(52) U.S. Cl. .......................................... 60/792; 60/802
(58) Field of Classification Search ................... 60/792, 60/796, 802, 805; 415/122.1
See application file for complete search history.

(56) References Cited

U.S. PATENT DOCUMENTS

| | | | | |
|---|---|---|---|---|
| 3,226,987 A | * | 1/1966 | McCarty ..................... | 74/15.63 |
| 3,343,854 A | * | 9/1967 | Dennison .................... | 403/320 |
| 3,449,926 A | * | 6/1969 | Hawkins ..................... | 464/154 |
| 3,602,535 A | * | 8/1971 | Behning et al. ............. | 403/118 |
| 3,611,834 A | * | 10/1971 | Dison ......................... | 475/343 |
| 3,622,185 A | * | 11/1971 | Rosan et al. ................ | 403/316 |
| 3,631,688 A | * | 1/1972 | Quick ......................... | 464/182 |
| 3,688,560 A | * | 9/1972 | Broman et al. ............. | 74/15.63 |
| 3,970,398 A | * | 7/1976 | Wilson ........................ | 403/26 |
| 4,456,425 A | * | 6/1984 | McCarty et al. ........... | 415/122.1 |
| 5,349,814 A | * | 9/1994 | Ciokajlo et al. ............ | 60/226.1 |

FOREIGN PATENT DOCUMENTS

| DE | 1 087 410 | 8/1960 |
|---|---|---|
| EP | 0 987 457 A1 | 3/2000 |
| FR | 2 633 023 | 12/1989 |

OTHER PUBLICATIONS

U.S. Appl. No. 11/668,233, filed Jan. 29, 2007, Servant.

* cited by examiner

*Primary Examiner*—Michael Cuff
*Assistant Examiner*—Phutthiwat Wongwian
(74) *Attorney, Agent, or Firm*—Oblon, Spivak, McClelland, Maier & Neustadt, L.L.P.

(57) ABSTRACT

A system for attaching the end of a shaft of a gas turbine engine engaged inside a coupling supported by a bearing is disclosed. The system includes a nut with a first thread which is screwed into the shaft and a second thread which is screwed to the coupling. Advantageously, the screw pitches of the two threads of the nut are reversed relative to one another so as to form an adjusting nut.

11 Claims, 8 Drawing Sheets

ATTACHMENT UNIT OF DRIVING SHAFT WITH TENSIONER NUT

The present invention relates to a gas turbine engine, in particular in the aviation field, and has as its object the installation of a rotor shaft inside the engine.

BACKGROUND OF THE INVENTION

The operations of installing and removing a turbine engine are awkward, because of the number of parts that they comprise and the small clearances between them while the dimensions may be considerable. The cost of the working on the engine comprising such operations is therefore always high. The aim is therefore constantly to simplify them. In a front, double-bodied turbofan engine, such as the cfm56 engine, access to the bearing supporting the high pressure compressor shaft is particularly difficult because it is installed, on the intermediate casing, behind the fan and the first two bearings supporting respectively the low pressure compressor shaft and that of the fan. The intermediate casing is the portion of the casing of the machine that supports in particular the front rotor bearings. In order to avoid dismantling the whole front portion of the engine and the fan in particular, the elements of this bearing are currently arranged so as to allow installation from the rear. Such a solution is advantageous, but still has some disadvantages that it would be desirable to eliminate.

DESCRIPTION OF THE PRIOR ART

FIGS. 1 and 2 are reminders of a solution corresponding to the teaching of the prior art. The whole engine is not shown; only the immediate environment of the bearing is visible. The front and rear are defined relative to the direction of travel of the engine. A portion of the fixed structure of the intermediate casing 2 can be seen; the HP compressor shaft ball bearing 3 is supported by its outer race in this fixed structure. The bearing provides rotational support for the front end of the HP compressor shaft 4 whereof the trunion 4' and a rotor disk 41" are seen. The bearing supports, at the front, a bevel pinion 5 which drives the pinion 5' connected to a radial shaft and forming the gearbox called IGB from which the auxiliary equipment is driven: pumps, electric current generators or other equipment. For this purpose, the bevel pinion 5 meshes with the pinion of the radial transmission shaft that is housed in one of the radial arms of the intermediate casing to drive the pinions of the accessory gearbox, known as the AGB. The bevel pinion is fixedly attached to the cylindrical coupling supported by the bearing.

To keep the shaft 4 in the bearing 3, according to the teaching of the prior art, a nut 6 is provided that is held inside the pinion 5, upstream by a segment or retaining ring 6'. The nut comprises a thread on its outer surface by which it is screwed into the upstream end of the shaft 4, provided with an appropriate thread. A nut-lock 6" keeps the nut in place in the shaft 4. Furthermore, the axial splines on the inner wall of the coupling of the pinion 5 interact with splines on the outer surface of the shaft 4 to prevent any rotation of one relative to the other. This assembly incorporates the function of auto-extraction of the HP compressor. The function is performed by the segment which axially fixedly attaches the bearing nut to the bevel gear. Thus, by tightening the nut in the thread of the HP compressor shaft, the compressor is docked with the bearing; conversely, by unscrewing the nut, the compressor is pushed rearward because the nut is immobilized axially by the segment.

FIG. 2 shows the bearing of the shaft 4 before installation. The nut, placed in front of the bearing is first installed on the pinion before any installation of the elements from the rear of the intermediate casing. To prepare the installation of the shaft 4, the bearing 3 needs to be heated at C in order to expand it and minimize the shrink-fitting forces. To avoid heating the nut 6 and to minimize the frictions in the thread when it is to be tightened onto the shaft 4, there is a heat protection P around the nut. However, this protection is awkward to apply. It cannot be installed effectively.

The applicant has set itself the objective of preventing the problems associated with this installation.

SUMMARY OF THE INVENTION

More particularly, the problem to be solved relates to a type of connection between the HP compressor and the engine IGB making it possible to install and remove the HP compressor with sole access by the tools via the rear of the engine.

According to the invention, the system for attaching the end of a gas turbine engine shaft engaged inside a coupling supported by a bearing, by means of a nut, is characterized in that the nut comprises a first thread, by which it is screwed into said shaft comprising a thread, and a second thread by which it is screwed to said coupling comprising a thread. More particularly, the two screw pitches of the nut are reversed relative to one another so as to form an adjusting nut.

The solution of the invention is therefore suitable for installing the HP compressor shaft of a double-bodied engine whose power offtake to drive the machines' gearbox is provided by a bevel pinion fixedly attached to the latter, the coupling belonging to this drive bevel pinion.

The use of an adjusting nut allows the HP compressor to be removed simply, by working only from the rear of the engine, and is not compromised by the tools and installation means currently used.

Installation/removal via the rear of the engine is a very major advantage for this type of engine and greatly reduces the cost of such an operation.

In addition, the solution is compact; it fits into the available space and does not interfere with the air circulation between the IGB and the LP shaft. The present application also relates to a compressor and a turbine engine incorporating the system of the invention.

BRIEF DESCRIPTION OF THE DRAWINGS

The invention will now be described in greater detail, with reference to the appended drawings in which.

DESCRIPTION OF THE PREFERRED EMBODIMENTS

Figure 1:
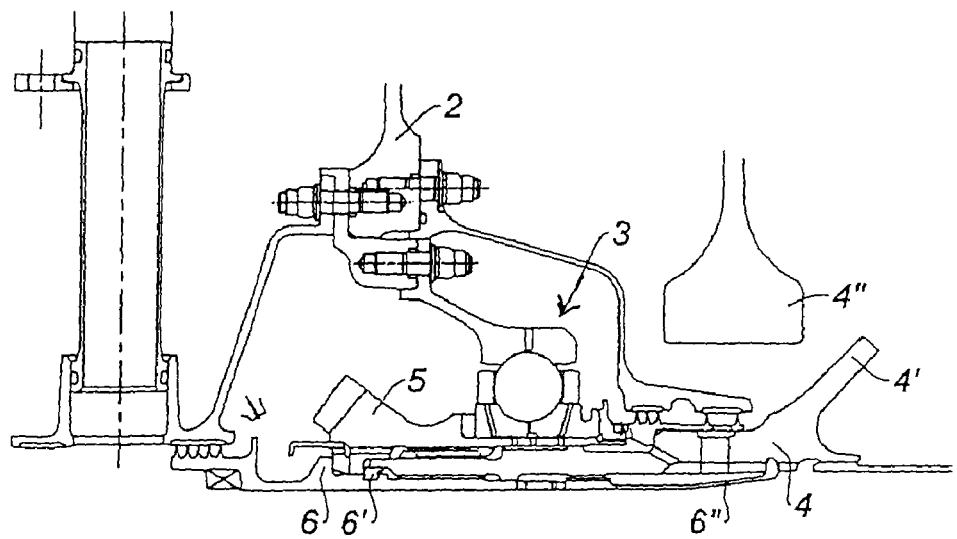
FIG. 1 represents, in axial section, a partial view of an installation solution corresponding to the teaching of the prior art.
Figure 1:
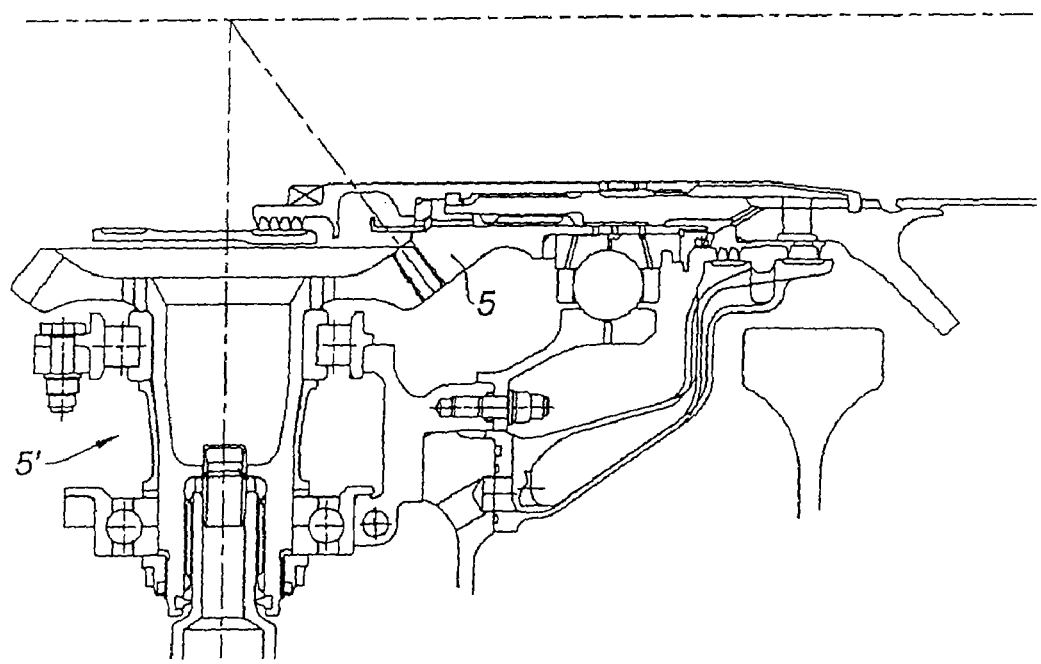
Figure 2:
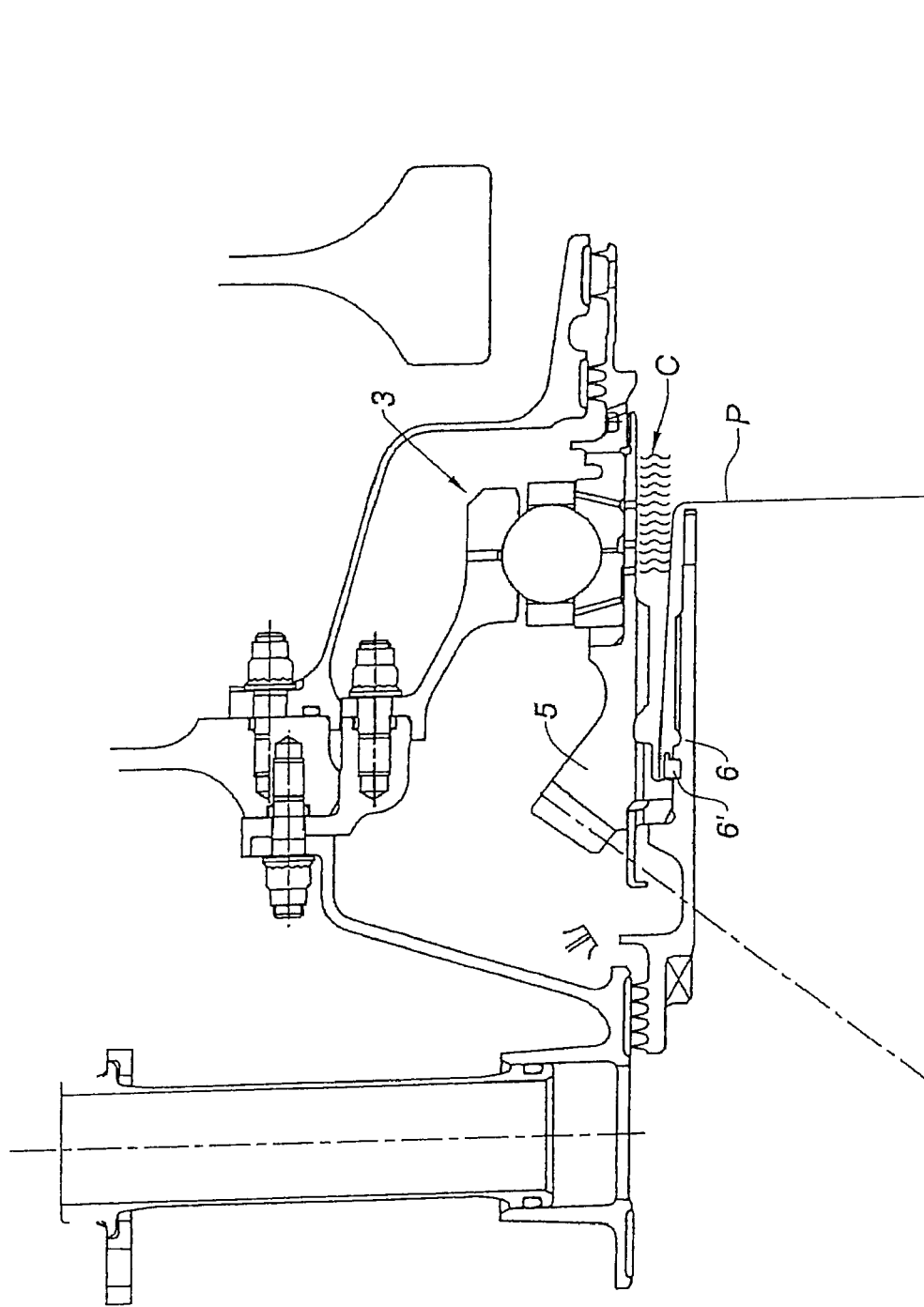
FIG. 2 shows the elements of FIG. 1 pre-assembled and before the HP compressor shaft is installed.
Figure 3:
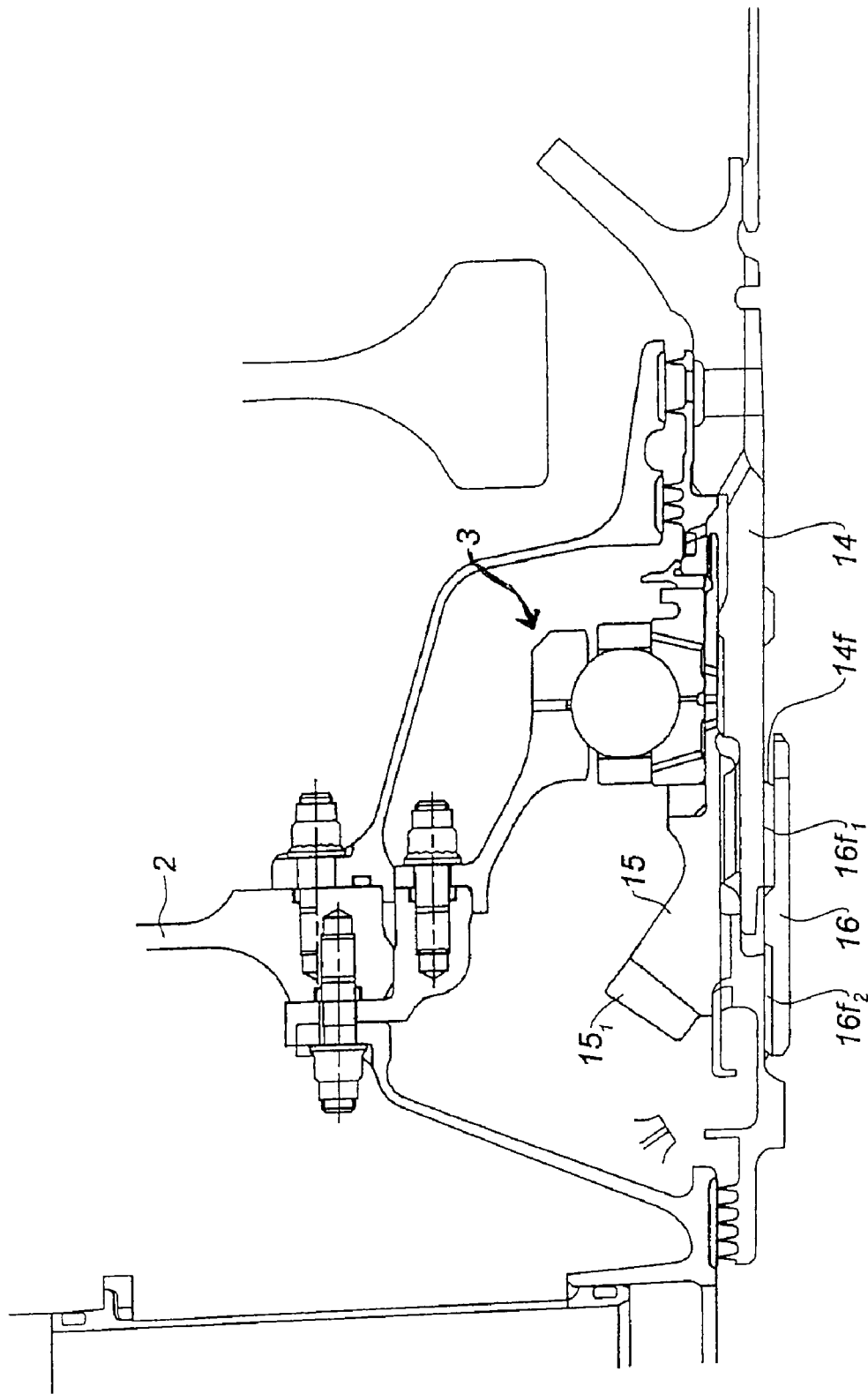
FIG. 3 represents, in axial section, a partial view of a system for attaching the end of the HP compressor shaft according to the invention.

FIG. 3 and following show an embodiment of the solution of the invention. The bearing 3 remains unchanged relative to the prior art as does the intermediate casing 2. The upstream end of the shaft 14 comprises, as in the solution of the prior art, an inner thread 14$f$ interacting with a first outer thread 16$f_1$ of a nut 16. This nut 16 is cylinder-shaped and connects the shaft 14 to a bevel gear 15. The bevel gear 15 comprises a bevel pinion 15$_1$ for driving the IGB. It also comprises a cylindrical coupling 15$_4$ shrink-fitted onto the inner race 3$i$ of the bearing 3. At the front, the gear 15 is fixedly attached here to a labyrinth seal element 15$_2$. Splines 15$_3$ are made inside the bevel gear to interact with splines 14$_3$ on the trunion 14 and keep them fixedly attached in rotation. The gear 15 also comprises an inner surface portion with a thread 15$f$ with which the cylindrical nut 16 interacts via a second thread 16$f_2$. The two threads 16$f_1$ and 16$f_2$ on the outer face of the nut 16 have reversed pitches as explained below.

Figure 4:
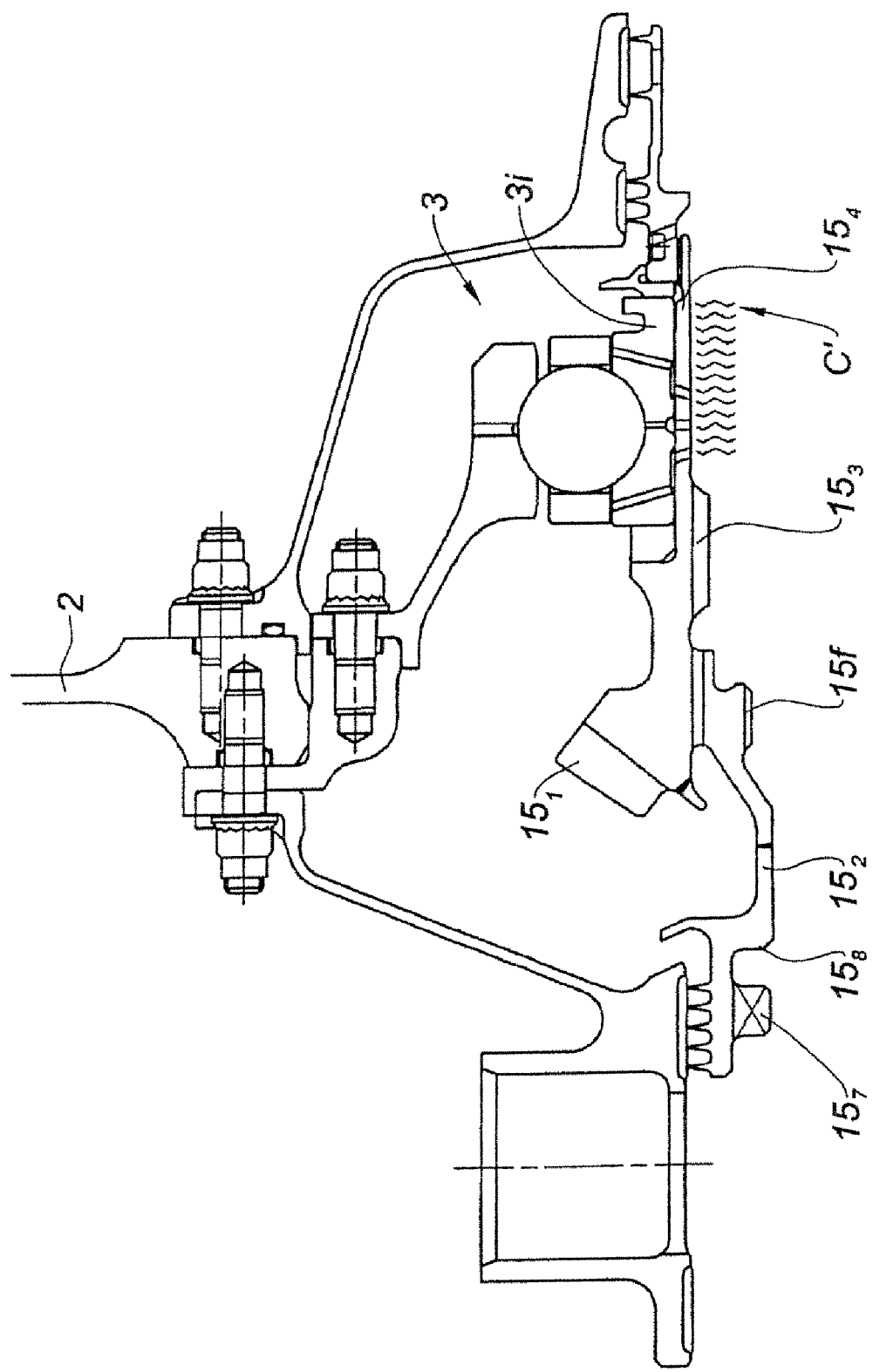
FIG. 4 shows the first step of the installation seen from the IGB side.

FIG. 4 shows the bearing 3 with the bevel gear installed on the inner race 3$i$ of the bearing 3 and a heating means C' indicated by wavy lines.

A description will now be given of the front installation of the HP compressor shaft in the bearing 3, with reference to FIG. 4 and following.

The bearing is assembled with the bevel gear 15 shrink-fitted into the race 3$i$ of the bearing. The first step consists in heating the bearing 3 by placing a heater under the race 3$i$. The advantage of the solution of the invention is already seen because, in the absence of a nut, no superfluous heating damages the surrounding parts.

Figure 5:
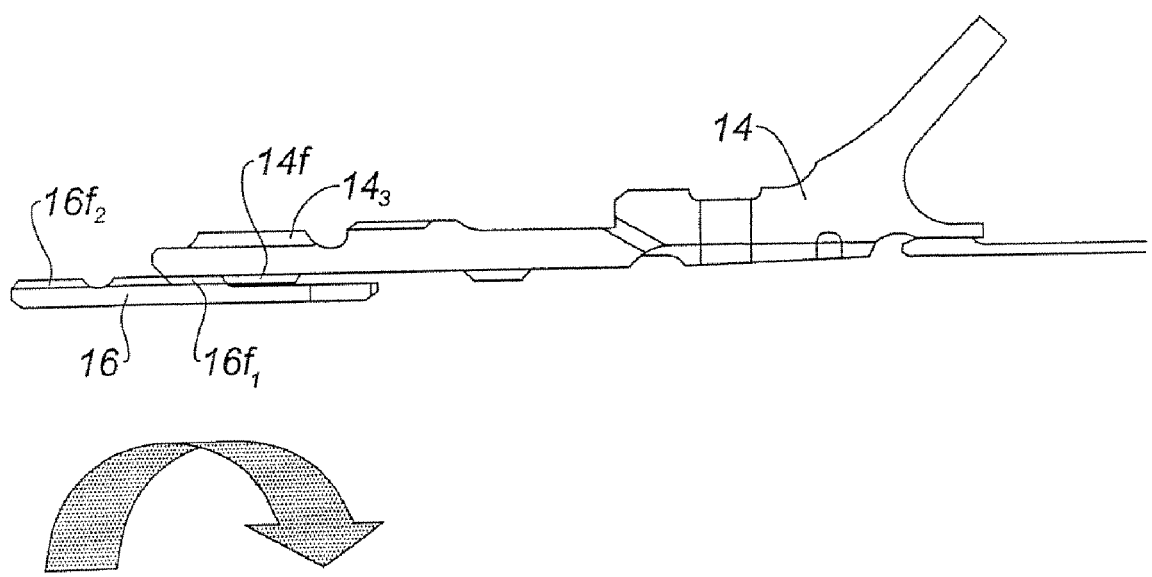
FIG. 5 shows the first step of the installation seen from the HP compressor shaft side.

In parallel, the nut 16 is placed on the shaft as shown in FIG. 5. The thread 16$f_1$ of the nut is engaged in the inner thread 14$f$ of the shaft 14, over a predetermined length in order to have a correct final installation.

Figure 6:
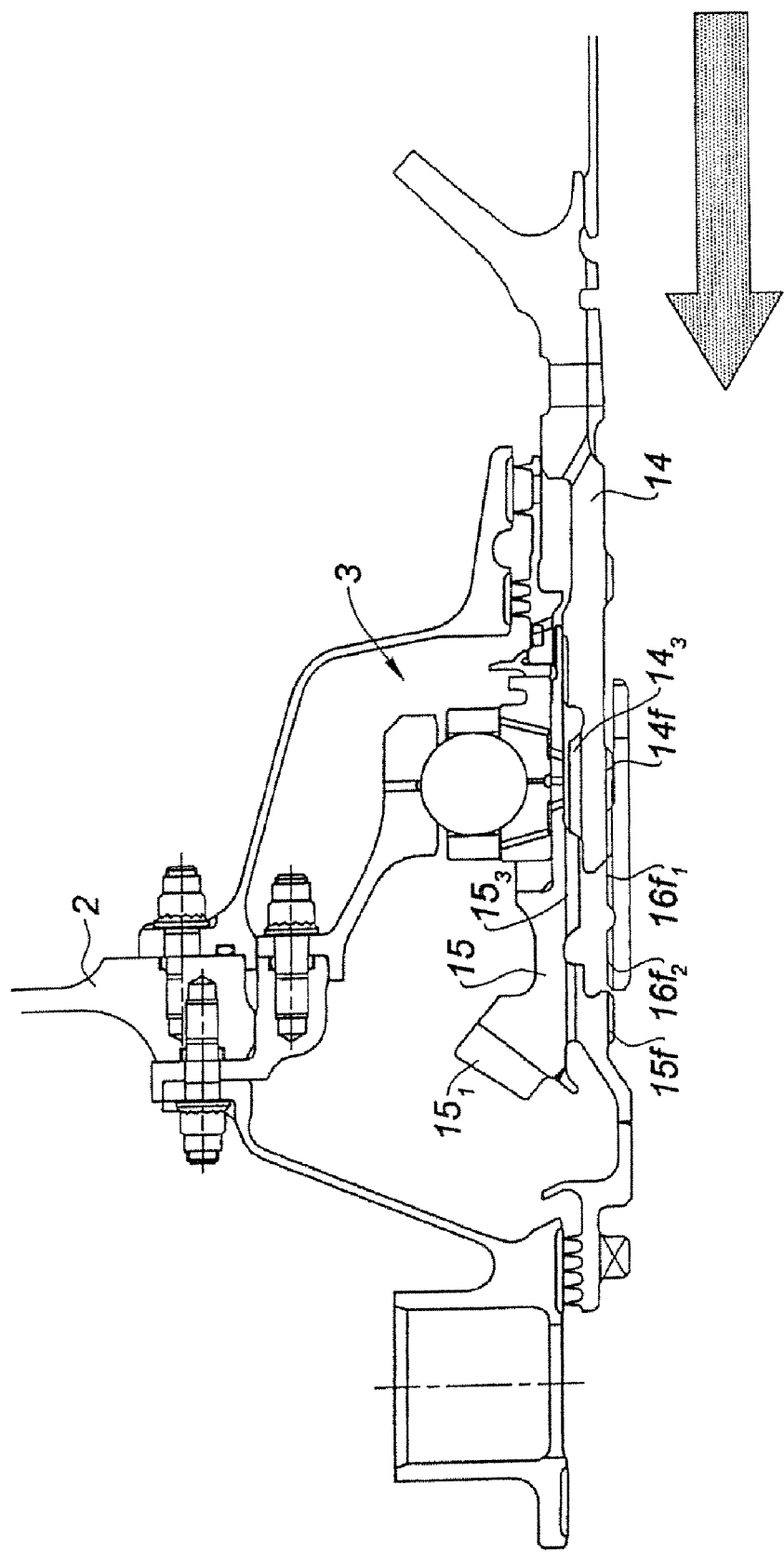
FIG. 6 shows the second step with the docking of the compressor shaft.

FIG. 6 shows that the shaft has been engaged in the bearing from which the heater has been removed and which is in the expanded state. The nut 16 has been screwed sufficiently onto the shaft 14 for it to butt against the thread 15$f$ of the bevel gear 15, just after beginning to engage the axial splines between the shaft and the bevel gear arranged to allow a good angular indexation between these two parts, necessary for the lubrication of the bearing 3 to operate correctly. The operator begins to tighten the nut 16 in order to engage the thread 16$f_2$ in the thread 15$f$. Since the pitches of the threads 16$f_1$ and 16$f_2$ are reversed, tightening the nut progressively inserts it into the gear 15 that has been immobilized in rotation by an appropriate means that cannot be seen. Furthermore, since the splines 15$_3$ of the gear 15 and 14$_3$ of the shaft are engaged in one another, the shaft 14 is prevented from rotating on itself. The rotation of the nut also causes the shaft to advance inside the bearing 3.

Figure 7:
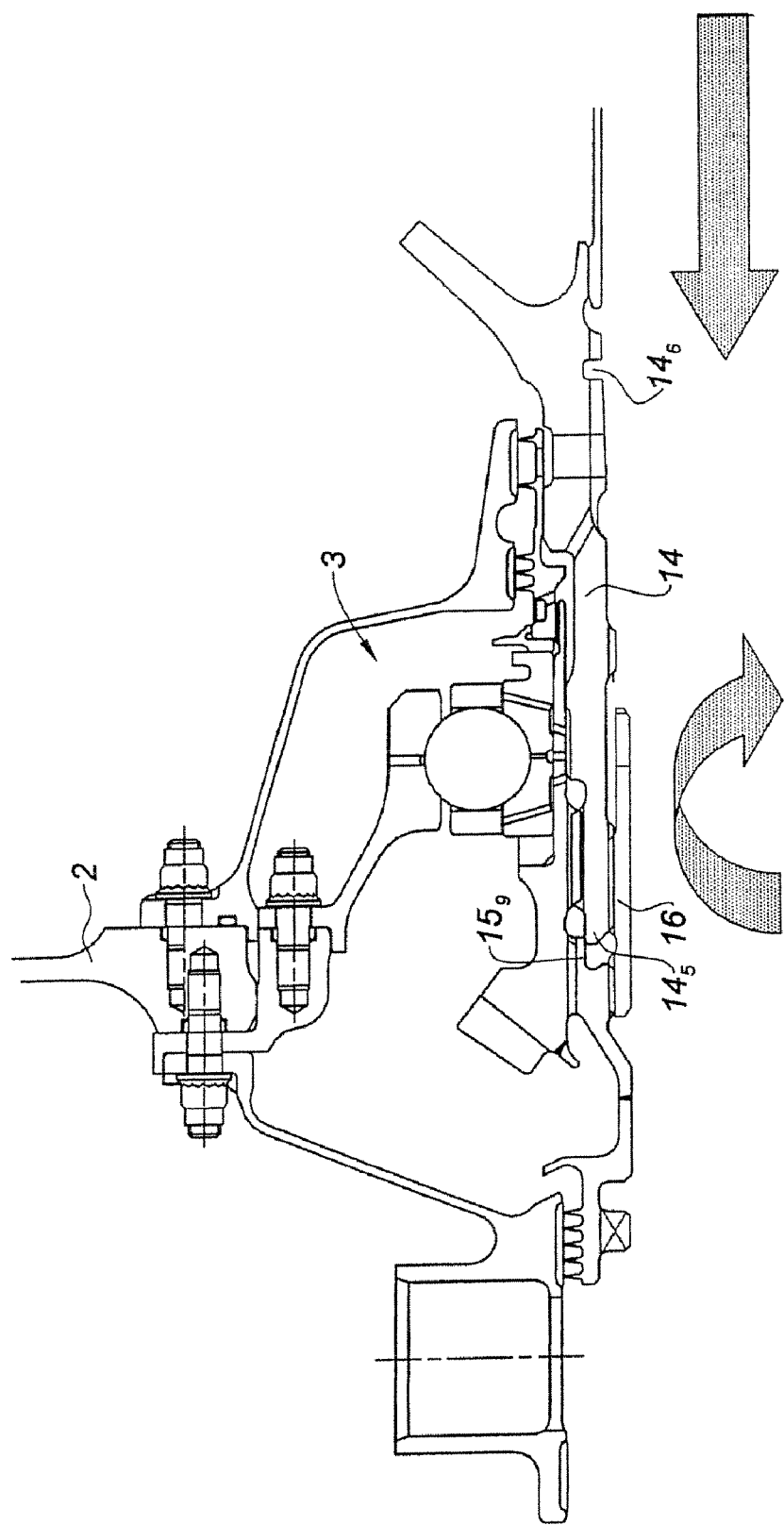
FIG. 7 shows the engagement further forward of the compressor shaft.

FIG. 7 shows that the shaft 14 has traveled further, until its front edge 14$_5$ comes into engagement in the corresponding shrink-fitting zone 15$_5$ inside the gear 15. This shrink-fitting zone makes it possible to ensure that the bevel pinion 15$_1$ of the gear 15 is effectively supported by the shaft 14.

Figure 8:
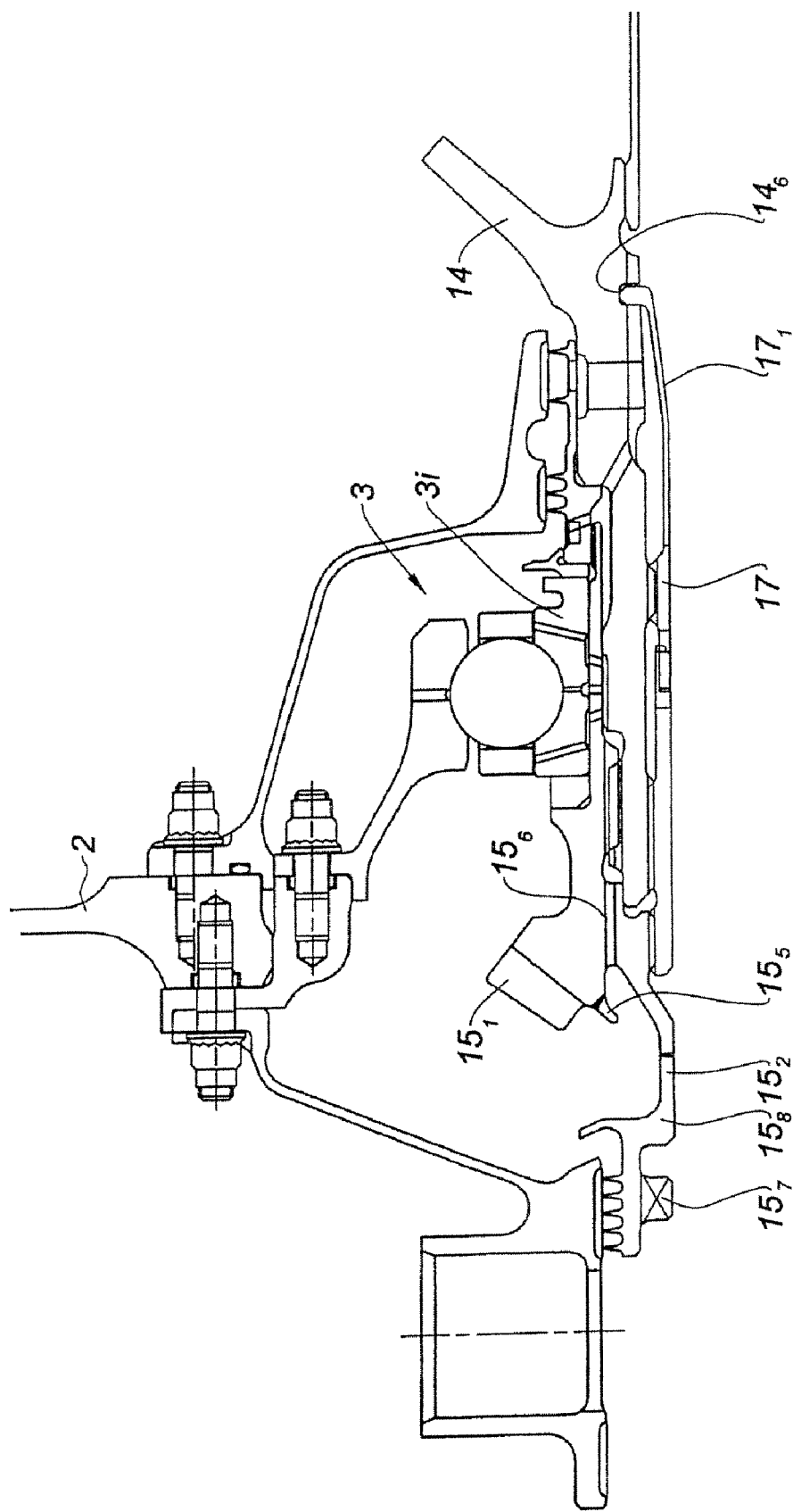
FIG. 8 shows that the tightening of the adjusting nut on the coupling of the bearing is complete and that a nut-lock has been put in place.

With reference to FIG. 8, it can be seen that the shaft is now butting against the part forming the rear labyrinth that is pressing on the inner race of the bearing 3. A nut-lock 17 has been installed. It comprises elastically deformable branches 17$_1$ which fit into a recess 14$_6$ made in the shaft 14. This figure shows the presence of the front portion 15$_2$ of the bevel gear that forms, with a scoop 15$_5$, a surface for receiving oil for lubricating the pinion 15$_1$ and the bearing 3. The oil delivery nozzle is not shown. This oil collected by the scoop 15$_5$ is guided through the longitudinal channels 15$_6$ and the splines 15$_3$ and 14$_3$ toward the bearing 3 that is provided with appropriate and known orifices for lubricating the balls.

The nut 16 may be called an adjusting nut because a tractile tension is applied to the shaft 14. The nut is rotated by known tools across the shaft from the rear in particular. To prevent forces from passing through the bearing, the bevel gear may be axially strapped by means of an appropriate tool that is placed, for example, in an axial strapping zone made between tenons 15$_7$ made at the front of the gear to prevent any rotation during the installation and a shoulder 15$_8$.

The invention claimed is:

1. A system for attaching an end of a high pressure compressor shaft of a dual spool gas turbine engine, comprising:
   a bevel gear which drives a transmission shaft of an accessories gearbox;
   a bearing which supports the bevel gear; and
   a nut with an inner circumference and an outer circumference with respect to an axis of the engine, the nut including a first thread and a second thread disposed on the outer circumference of the nut,
   wherein the shaft is engaged inside a coupling of the bevel gear, and
   wherein the first thread of the nut is screwed into said an inner thread of the shaft and the second thread of the nut is screwed to an inner thread of said coupling of the bevel gear.

2. The system as claimed in claim 1, wherein screw pitches of the first thread of the nut are reversed relative to screw pitches of the second thread of the nut.

3. The system as claimed in claim 1, further comprising a nut-lock.

4. The system as claimed in claim 1, wherein the shaft and the coupling are guided into one another by axial splines.

5. The system as claimed in claim 4, wherein the bevel gear comprises a means which clamps the bearing axially during the tightening of the nut.

6. A turbine engine compressor incorporating a system of attaching the end of a rotor shaft as claimed in claim 1.

7. A dual spool gas turbine engine comprising an attachment system as claimed in claim 1.

8. The system according to claim 1, wherein an outer race of the bearing is supported by an intermediate casing and the coupling of the bevel gear is shrink-fitted onto an inner race of the bearing.

9. The system according to claim 1, wherein a labyrinth seal element is fixedly attached to a front portion of the bevel gear.

10. The system according to claim 1, wherein an outer circumference of the shaft contacts an inner circumference of the coupling of the bevel gear and an inner circumference of the shaft contacts an outer circumference of the nut.

11. The system according to claim 3, wherein the nut lock includes a plurality of elastically deformable branches which fit into a recess disposed on an inner circumference of the shaft.

\* \* \* \* \*